3,266,165
PROCESS AND APPARATUS FOR SEGREGATIVE DRYING OF NYLON-6
Basil G. Apostle, Richmond, Albert H. Wiesner, Petersburg, Fred W. Le Noir, Hopewell, and Orvill E. Snider, Petersburg, Va., assignors to Allied Chemical Corporation, New York, N.Y., a corporation of New York
Filed Oct. 1, 1964, Ser. No. 400,678
7 Claims. (Cl. 34—28)

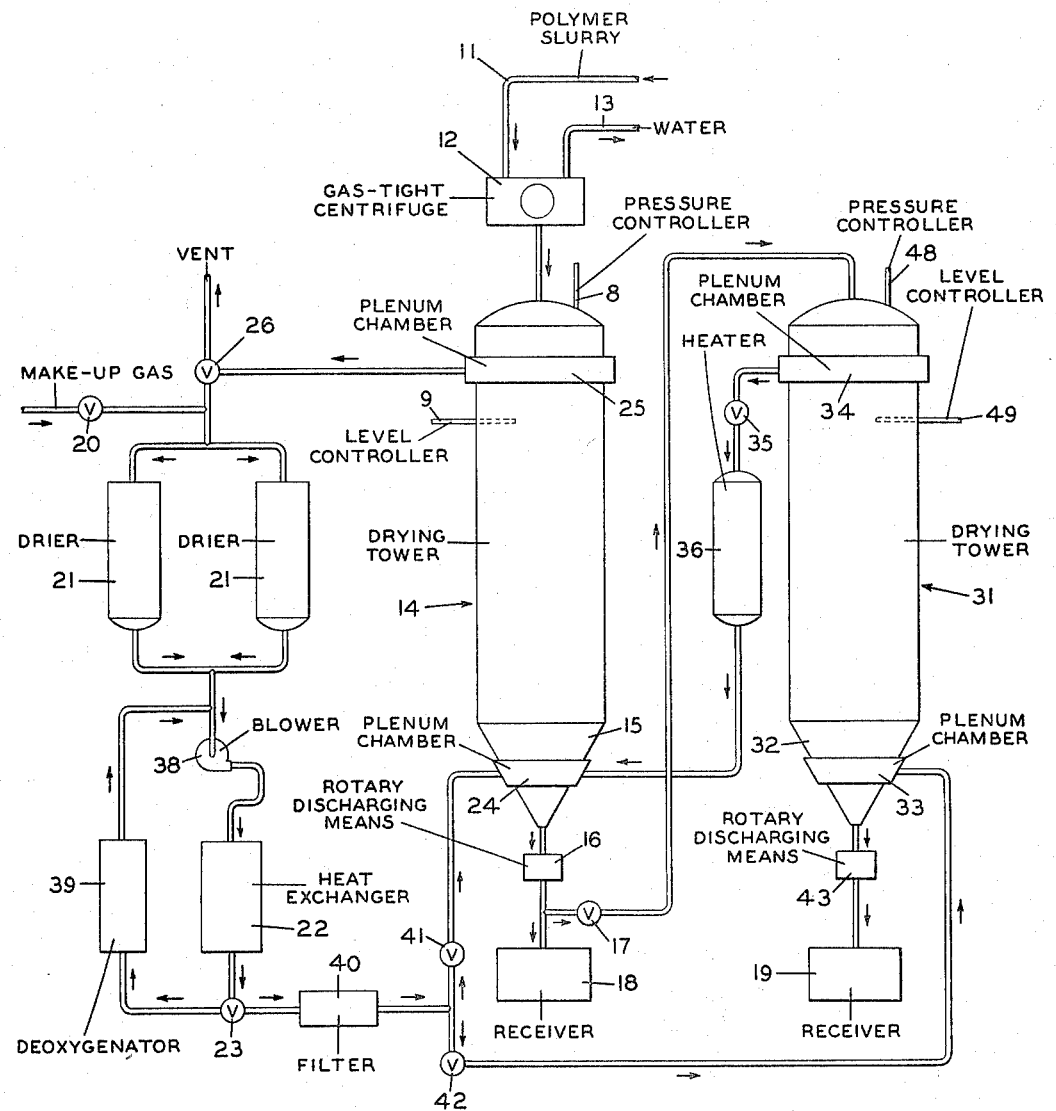

This invention relates to a process for evaporatively removing liquid from solid particles of nylon-6, i.e., the polymeric amide consisting essentially of recurring capro-amide groups joined in a polymeric chain of an average chain length at which the polymer can be formed into molecularly oriented filaments.

The production of solid materials frequently involves the removal of liquids, such as solvents or washing agents, from the solids before further processing the material. Such a need to remove a liquid from a polymer arises in the preparation of nylon-6, after the usual water-washing step.

One of the methods used in the art for drying nylon-6 involves subjecting particles thereof to a vacuum. Such a process, however, has the disadvantage that the drying equipment is costly, and it is difficult to perform vacuum-drying continuously and at high production rates.

More recently, it has been proposed to dry the polymer in a tower with countercurrent downward movement of the particles and upward movement of the drying gas. Such a method is illustrated, for example, in Zehnder U.S. Patent 3,112,118 of November 26, 1963.

Continuous drying techniques heretofore proposed for nylon-6, when utilized on a commercial scale, are subject to a number of disadvantages. One of these arises from the fact that the polymer is, to an appreciable extent, mixed or blended in the drying apparatus whereby the product is a blend obtained from starting materials fed at different times. Consequently when changing the apparatus over from drying one type of polymer to another, it is necessary to empty the apparatus of the first polymer before introducing the second so as to avoid mixing the two polymers in the drying apparatus. The emptying and refilling of the apparatus results in a long unproductive period.

A further disadvantage arising from the mixing of polymer in the prior art apparatus is that the individual polymer particles are exposed to varying residence times prior to their discharge; whence an appreciable percentage of particles will be obtained which have been in the apparatus for significantly different times (both shorter and longer) than the average residence time for the particles. A long residence time at the elevated temperatures desirably used for high production rates tends to bring about further polymerization in the particles thus treated, whereby the molecular weight and hence the melt viscosity of polymer contained in these particles increases. A short residence time can result in unduly high moisture in the individual particle, which in turn can produce a reduction in molecular weight and melt viscosity, during melt spinning, in the polymer contained in these particles. The resultant variable viscosity is very undesirable, because the spinning operation wherein the polymer is converted into filaments becomes difficult to control with the requisite high uniformity; and the yarns produced from such variable viscosity polymer have a tendency to break under tension and to fall below the desired level of uniformity in properties such as dyeability.

It is an object of this invention to provide a continuous process which will produce dried nylon-6 particles at high production rates.

Another object of this invention is a process for continuously drying nylon-6 particles in a manner which maintains throughout the drying operation the segregation of each portion of the mass from the portion which immediately follows it in the feed.

Yet another object of this invention is a process for continuously drying nylon-6 particles in a manner which maintains each particle in the drying zone for a time which is susbtantially equal to the time of residence therein of every other particle.

Further and more specific objects, features, and advantages will appear from the detailed description given below taken in connection with the accompanying drawing which forms a part of this specification.

The process of this invention comprises continuously downwardly passing wet nylon-6 particles as obtained, e.g., by centrifuging a polymer slurry and containing say about 5%–20% by weight of water, as a single compact cylindrical mass through a confined zone, e.g. a vertical enclosed cylindrical tower, having constant diameter throughout the cylindrical portion and having over-all height:diameter ($H/D$) ratio in the cylindrical portion of at least about 5:1 but not greater than 20:1. The cylindrical zone and consequently the polymer mass terminates in a frusto-conical discharge section having sides inwardly and downwardly sloping at an angle from the vertical of about 5°–40°, and having ratio of maximum diameter (where it joins the cylinder): minimum diameter (at the discharge opening) in the range of 3:1–12:1. The particles descend at a velocity not above about 30, preferably not above 20, feet per hour; and heated inert drying gas is maintained in contact with the particles at no less than 10 p.s.i.g., and is flowed up the tower countercurrently to the descending polymer particles.

The inert gas is introduced into the tower in an amount ranging from about 40 to about 140 standard cubic feet of gas for each pound of particles on a dry basis. The incoming gas as introduced into the tower is heated to a temperature in the range of about 80° C.–180° C., and the residence time of the polymer in the tower will be from about 1 hour to say about 2 days. The dried polymer is continuously removed at the bottom of the discharge section; and the moist gas resulting from the operation is withdrawn from the top layer of the cylindrical mass of nylon-6 particles in the tower.

When polymer is dried according to the above-described process, it is found that all of the polymer particles have essentially identical residence times in the drying tower and furthermore that each layer of polymer which passes downward through the tower is kept segregated from the layer which immediately follows it. This ability to pass particles of polymer downwardly through the tower in a segregated manner so as to obtain plug flow with essentially no back-mixing is herein termed "segregated flow," and the process for drying particles in this manner is herein termed "segregative drying."

The accompanying drawing is a schematic illustration of apparatus and process in accordance with this invention. The best mode contemplated by us for carrying out our invention is as follows, reference being had to the accompanying drawing.

In the drawing, the principal apparatus elements are gas drier 21; blower 38 for compressing and forwarding the drying gas; heat exchanger 22 for adjusting the gas temperature; and cylindrical vertical tower 14 with conical discharge section 15. The tower is fitted with plenum chamber 24 around the conical bottom by way of which gas enters the tower; and with plenum chamber 25 at the top by way of which gas is withdrawn from the top layer of particles in the tower. A feeding means at the top of the tower such as a gas-tight centrifuge 12 continuously feeds wet polymer particles into the tower against the superatmospheric gas pressure therein. A level controller 9, such as a radiation device, controlling a positive discharge device 16 at the bottom of the tower is provided to automatically adjust the rate of discharge from the tower in response to change in level of the solids therein, thereby maintaining a constant level of solids corresponding to the desired residence time of the solid polymer in the tower, not withstanding any temporary variations in feed rate of the solid which may occur.

In preferred operations, wet nylon–6 particles containing usually about 10%–18% by weight of water, e.g., as separated from an aqueous slurry, are continuously fed to the top of tower 14 by a gas-tight centrifuge 12 which is capable of holding superatmospheric gas pressure, and discharging solids against the superatmospheric gas pressure of at least 10 p.s.i.g. maintained in tower 14. Water is separated in centrifuge 12 from the polymer slurry and is discharged via line 13. The particles descend in a single compact mass through tower 14 at velocities not above 30 feet per hour under the regulation of level controller 9, which regulates the discharge rate to maintain constant level in the tower. The dried particles are removed from the bottom of conical section 15 via positive discharge means 16 controlled by level controller 9, and pass into receiving vessel or forwarding apparatus 18.

Essentially oxygen-free gas (i.e., containing not above 50 parts per million oxygen) is continuously passed through a drying medium in drier 21 which brings the gas to the desired low dew point. Thence the dried inert gas passes through a blower and compressor 38, and thence through heat exchanger 22 to adjust the temperature upwards or downwards to the desired temperature level, the necessary adjustment depending upon the heat put into the gas by blower 38 as it compresses the gas. A portion of the main gas stream, say about 5–10%, is then bypassed around the heat exchanger 22 and blower 38 through deoxygenation unit 39 to reenter on the suction side of the blower 38. This deoxygenation is a precaution to prevent any build-up of oxygen in the circulating gas due to leakage of air into the gas, or other contamination with oxygen. The inert gas is forwarded through a gas filter 40 to remove all solid particles above 1 micron and the majority of solid particles between 0.1 and 1.0 microns. Use of such dust-free gas is important to give polymer which can be passed without clogging through filtering media before spinning.

By the above described treatment, the incoming drying gas is obtained at low dew point and at the desired temperature and pressure, and at a desired low oxygen content. This drying gas is then introduced via valve 41 into the bottom of tower 14 through plenum chamber 24. The plenum chamber communicates with the tower through a number of apertures on the cone wall, for example, four equally - spaced circular apertures. The gas passes upwardly through tower 14 and passes countercurrently to the polymer particles. The off-gas is withdrawn at the top of tower 14 through plenum chamber 25 as spent drying gas. A pressure controller or pressure relief valve can be provided at the top of the tower if desired, as indicated at 8 in the drawing; but suitably the pressure will be set by blower 38.

As shown in the drawing, the spent gas may be partially or entirely vented through valve 26. Generally most or all of the spent gas is mixed with make-up fresh inert gas admitted via valve 20, and is recirculated through drier 21 and heat exchanger 22 to tower 14.

When intensive drying and high capacity at a given production rate are desired, one or more additional vertical towers will be employed, generally similar to that described, as shown in the drawing. Oxygen-free drying gas, produced as above at controlled temperature and dew point and with not above 50 p.p.m. oxygen content, is introduced as incoming gas in such operations using two towers through valve 42 into final drying tower 31, via plenum chamber 33 at the bottom thereof. The off-gas is withdrawn via plenum chamber 34 through valve 35 as partially spent drying gas. Its pressure can be controlled separately from the gas pressure in tower 14, if desired, by pressure controller 48.

The partially spent drying gas is preferably then passed through a heater 36 to produce heated inert gas which is introduced into tower 14 via plenum chamber 24 and contacts wet polymer particles in tower 14 as previously described. The spent gas separated from the polymer mass in tower 14 is then passed together with make-up gas through drier 21, blower 38, and heat exchanger 22 as previously described.

Partially dried polymer is withdrawn from tower 14 via valve 17 and is introduced into the top of the final drying tower 31, for countercurrent contact with the drying gas therein; and is removed at the bottom of tower 31 at a rate regulated by level controller 49 to maintain the solids at constant level in the tower. The dried polymer product is withdrawn into vessel 19. When this embodiment is practiced, tower 14 acts as a pre-drier, and final drying is accomplished in tower 31.

As above pointed out, the inert gas supplied to drying tower 14 is under super-atmospheric pressure of at least 10 p.s.i., i.e., is at pressure throughout the tower of at least 10 p.s.i.g. Whereas in previously proposed processes for drying nylon–6, atmospheric pressure gas or vacuum has been employed, we find that in our process use of gas under substantial super-atmospheric pressures is a practical necessity to accomplish drying at high production rates while maintaining segregation of the successive portions of polymer being dried. One reason for the favorable effect of gas under pressure is believed to be that the compressed gas has greater heat capacity for giving volume than does the same gas at lower pressure. Accordingly the compressed gas can be passed up a relatively high, narrow column of wet solids in sufficient amounts to supply the heat required to dry the solids at good rates, without travelling at a velocity which would expand or fluidize the solid bed and thus intermix different layers thereof.

When more than one drying tower is used in accordance with our process, it is convenient to maintain the drying gas under pressure as long as the gas remains in circulation in the system. In such operations using more than one tower, the gas can accordingly be brought to suitable pressure and supplied to the final tower, then to the earlier towers. It will also be possible in such operations, if desired, to maintain the gas under relatively high super-atmospheric pressure in the first stage drying tower 14 where the bulk of the water is removed from the polymer. The gas supplied to the second stage tower 31 can accordingly be maintained by pressure controller 48 at a lower pressure than that of the gas supplied to the first stage tower 14 say at just enough pressure to prevent leakage of air into this tower 31.

It has been found that is segregative drying is to be obtained, the cylindrical mass of polymer being dried by our process must have constant diameter and must have height:diameter ($H/D$) ratio of at least about 5:1. For best results, it is preferred to use $H/D$ ratio of at least about 6:1. The reasons for these requirements are not entirely clear but appear to be connected with frictional effects at the walls and in the body of the polymer.

It has been found that a deviation of more than about 15% from segregated flow results in a significant debasement of product quality. As used herein, the "percentage deviation" from segregated flow is defined by the formula $$\text{Percent deviation} = \left[ \frac{V(\text{max.}) - V(\text{min.})}{V(\text{avg.})} \right] \times 100$$

where V(max.) is the maximum particle velocity through the tower, V(min.) is the minimum particle velocity through the tower, and V(avg.) is the average velocity of the particles through the tower.

These particle velocities can be determined by supplying a portion of colored wet nylon–6 particles at the top of a mass of polymer in a tower having a cylindrical column and terminating in a frusto-conical discharge section the sides of which make e.g. a 30° angle inward and downward from the vertical; and operating said tower to continuously dry polymer therein in accordance with this invention. V(max.) and V(min.) are calculated by observing respectively the time, starting from the time when the colored particles were fed, for the first colored particles to emerge from the discharge section of the tower, and the time for the last colored particles to emerge; and dividing these times by the vertical height from the discharge opening to the top of the polymer mass in the tower. V(avg.) is the average of V(max.) and V(min.). The following Table I shows average values obtained from tests wherein nylon–6 particles were fed through small columns of various diameters while maintaining various ratios of column height:column diameter. It was found that the results are not substantially affected by the variations in column diameter used; but the height:diameter ($H/D$) ratio has a sharp effect, as shown in Table I, up to a value of about 5 or 6:1; then the effect tapers off to small deviations.

TABLE I

| $H/D$ ratio: | Percent deviation |
|---|---|
| 1:1 | 74 |
| 2:1 | 46 |
| 3:1 | 28 |
| 4:1 | 17 |
| 5:1 | 11 |
| 6:1 | 6 |
| 7:1 | 4 |
| 8:1 | 2 |
| 9:1 | 1.5 |
| 10:1 | 1 |

The angle made by the inwardly and downwardly sloping sides of the frusto-conical discharge section of the towers used in accordance with our invention influences the flow of polymer particles in the cylindrical column of the tower above the discharge section. If the sides are too nearly horizontal, there will be too slow a flow of polymer down the sides of the cone, so that polymer will be held up around the sides of the tower with resulting mixing of this polymer with polymer fed later to the tower, and long residence time of this portion of polymer which is held up in the tower. Too steep an angle, narrowing down from a tower diameter of commercial size to usual pipe sizes, results in an unduly long conical discharge section. Broadly, these angles can be in the range of about 5°–40° inward and downward from the vertical and preferably are about 30°–35° corresponding to an apex angle of 60°–70°.

As above-indicated the diameter of the discharge opening influences the flow of particles within the tower. Too small a diameter, in proportion to (1) the diameter of the tower and (2) the existing pressure differential between the tower and the outlet causes irregular discharge. The diameter must, nevertheless, be small enough to allow a gas-tight junction to be made with pipes or forwarding apparatus of normal sizes. Suitable diameters for the discharge opening are in proportion of about $\frac{1}{12}$–$\frac{1}{3}$ of the diameter of the cylindrical tower. Thus the frusto-conical bottom section of the tower will have ratio of maximum diameter (at the top):minimum diameter (at the discharge opening) in the range of about 3:1–12:1.

When a frusto-conical discharge section is referred to herein, it will be understood that this section need not be an exact geometrical frusto-cone but will be of generally conical form wherein for example the sides may be somewhat concave or convex rather than perfectly straight; and similarly the cylindrical column referred to need not be perfectly circular in cross section but may be modified to e.g. oval cross section, etc.

The drying gas used in our process can be any gas which has the capacity to remove the undesired liquid and which will not react with the polymer being dried. Preferably the drying gas should be substantially oxygen-free, to allow use of relatively elevated temperatures for drying. Examples of gases which can be employed are nitrogen, carbon dioxide, helium, hydrogen, argon, methane, carbon monoxide and mixtures of these. The dew point of the gas as it first contacts the polymer is suitably about minus 20° C. or lower, as measured at ambient atmospheric pressure. A range of about −35° C. to −50° C. will generally be found satisfactory.

A preferred example of an economical, essentially oxygen-free gas to be used in the practice of this invention is the dehumidified gaseous product of burning natural gas in air. Such a gas has nitrogen content from about 66% to 88%, carbon dioxide content from about 10% to about 30%, and hydrogen content from about 0.1% to about 5%, all these percentages being by volume. The gas usually also contains other inert gases such as carbon monoxide and argon in quantities less than about 2% by volume of the total gaseous mixture.

It has been found economical to dry the spent inert gas which is withdrawn from the top layer of the mass of wet particles and to reheat and recirculate the gas through the system. Where this is done, or where the gas is produced by burning natural gas with air, it is frequently desirable to have say about 1%–5% hydrogen present in the gas. Such hydrogen-containing gas or a portion thereof can be passed over a catalyst in a deoxygenator e.g. as indicated at 39 of the drawing, to cause the hydrogen and any oxygen present in the gas to form water, which can be removed if so required to establish the desired dew point of the gas. Examples of suitable catalysts are palladium, platinum or nickel deposited on a suitable carrier such as $Al_2O_3$ or $ZrO_2$. Alternatively or additionally, oxygen-absorbent substances such as Na-K metal alloys, manganous oxide, copper metal, and ammonia solutions of copper salts can be provided in deoxygenator 39. Generally it will prove satisfactory to pass about 1%–10% of the inert gas through the deoxygenator, whereby slow build-up of oxygen is prevented and any sudden build-up can be detected early.

In the production of synthetic fibers and plastics, the physical appearance is often important in that deviation from a fixed standard of color may render the end-product noticeably different in color and therefore of substandard grade. This substandard material may have to be discarded or subjected to further manipulation with a corresponding economic loss. Frequently, a visual difference in the color of nylon-6 polymer can be observed when the oxygen content in the drying gas is appreciably above 50 parts per million (p.p.m.). Generally, then, it is preferred that the gas be essentially oxygen-free i.e.

contain not above about 50 p.p.m. of oxygen. Where the nylon polymer contains metal stabilizers such as copper and manganese, oxygen contents in the inert gas of greater than 25 p.p.m. in oxygen will frequently result in a visual change in the color of the polymer, and accordingly it is preferred under these conditions to limit the oxygen content to a 25 p.p.m. maximum, if color change is important.

A pressure of the gas throughout the tower of at least about 10 p.s.i.g. greatly increases the productive capacity when the entering polymer feed contains about 5%–20% by weight of water, as previously noted. A range of from about 10 to about 160 p.s.i.g. is satisfactory. At pressures in excess of 160 p.s.i.g., the fabrication of towers to handle the pressure becomes considerably more expensive. It is preferred to use a range from about 1 atm. to about 3 atm. above atmospheric pressure for the drying gas.

The temperature of the incoming gas, i.e. the gas first contacting the polymer, should lie in the range of from about 80° to about 180° C., and preferably in the range of from 100° to about 150° C. At temperatures lower than about 80° C., the gas does not generally absorb moisture at a sufficient rate to obtain commercially practical residence times, while temperatures above 180° C. are so high that the polymer tends to become tacky, and this prevents orderly and controlled discharge from the tower. The preferred upper temperature limit is 150° C., at least when low moisture content of the polymer of 1% by weight or less, has been reached; since in dry polymer at temperatures above this, there is increasing risk of undesirable solid-state polymerization occurring even when control is maintained over residence time by maintaining constant level of solids.

Another factor which is important in maintaining the segregative drying is the amount of gas supplied per pound of polymer to be dried. In general, it has been found that from about 40 to about 140 standard cubic feet of drying gas should be supplied for each pound of polymer on a dry basis, i.e., the quantity of gas is calculated on the weight of the water-free polymer particles. Preferably, the amount of gas used lies in the range of from about 60 to about 120 standard cubic feet of gas for each pound of polymer. When the gas is under operating pressure its volume will of course be smaller than when at standard conditions. By using gas under pressure, as previously noted, it is possible to flow these volumes of gas up the towers used in our process without fluidizing the bed of particles; such fluidizing would intermix successive portions of polymer.

The minimum residence time of the polymer in the drying tower or towers, needed in our process to remove the bulk of the water from particles containing 5–20% by weight of water, is about 1 hour. For drying such particles to low moisture content of not above about 0.1%, the time required in our process will generally range between about 5 and about 30 hours. At gas flows from 60 to 120 standard cubic feet of gas per pound of polymer and incoming gas temperatures of 100°–150° C., preferred relationship between the polymer residence time and the gas temperature can be defined for our process. High production rates and high quality polymer of low moisture content, not above 0.1% by weight, are obtained, we have found, by correlating overall residence time of the polymer in the towers with temperature of the gas entering each of the towers as follows:

$\text{Log}_{10}$ of the residence time in hours
$$=2.912-0.0144(T\pm10°\text{ C.})$$

where $T$ is the temperature in ° C. of the gas entering at the base of each of the drying towers. This temperature "T" can be the same for all towers when more than one tower is used; or as indicated by ±10° C. in the formula, the temperature of the entering gas can differ for the several towers. In each tower, however, the temperature is preferably closely controlled within ±1° C., to assure production of polymer of high quality and desired moisture content at the residence time set by the rate of polymer feed and by the level of solids maintained in the towers. If the rate of polymer feed is changed, such change can be accommodated in our process by changing the level of solids in the towers and/or by changing the temperature of the incoming gas, without interruption of the drying process. In determining the preferred residence times in more than one tower in our process, when the temperature of the gas entering different towers substantially differs, the range of residence times for each temperature used can be calculated by the above formula and the results then divided by the number of towers to indicate the preferred ranges of residence times in each tower.

As the temperature of the entering gas is increased, the more important is the control of the residence time within the above defined limits. By operating at relatively elevated temperatures of inlet gas, between about 100° C. and about 150° C. within the limits determined by the foregoing equation, a 4 to 6-fold increase in production rate is obtained over conventional batch operation, without sacrifice in polymer quality.

In order to maintain good particle and gas distribution so that segregative drying is obtained rather than channelized flow of the particles or gas, we have found, it is desirable to limit the average velocity of particles through the tower to about 30, preferably about 20, feet per hour as a maximum. These velocities, of course, are with respect to a fixed point on the tower and do not represent the velocity of the particles with respect to the drying gas which flows through the tower. As average particle velocities (as determined e.g. by observing time for passage of a layer of colored particles through the tower) are increased we have found that the precentage deviation from segregated flow, above defined, increases by increments which about double for each 4 feet per hour increase in particle velocity. Thus we found, for example, that for a given "% Deviation," at say 8 feet per hour polymer velocity, an increase of polymer velocity to 20 feet per hour increased this deviation by about 1 percentage point, and increasing the polymer velocity to 24 feet per hour increased the original deviation by about 2 percentage points, etc.

The particle size and shape of the polymer may vary widely in the pratice of this invention. Polymer particles with diameters and lengths ranging from about 0.05 to about 0.20 inch have been used in the practice of this invention. In general, a smaller particle size tends to cause undue dusting and results in quality control problems in the textile yarns; while a larger size would result in a protracted drying period. Preferably the size of the polymer particle will range from about 0.08 to about 0.15 inch in diameter and in length. While the polymer particles can have various prismoidal or other shapes, the preferred form is circular rods, such as are produced by cutting extruded spaghetti-like polymer into short lengths.

It is quite common for nylon–6 polymers to contain additives to enhance their opacity or other physical properties. The process of this invention makes it possible to change the pigments, additives, catalysts, or molecular weight of the nylon–6, or other polymer, without shutting down the column, since the segregative nature of the polymer flow through the tower permits a sharp "break" between two different types of polymers in the column. This permits the introduction of, for example, a differently pigmented polymer into the tower or towers while another type is still being dried.

We have found that by practice of this invention, one large process system will replace 4 to 12 separate prior art process lines with corresponding substantial reduction in equipment costs.

In brief, important terms and analytical methods referred to herein are as follows:

The term "Formic Acid Relative Viscosity" means the viscsoity determined by measuring density and efflux time of a solution of polymer in aqueous 90% formic acid at 25° C. and a concentration of 11 grams of polymer per 100 cc. of solvent in accordance with ASTM Method No. D–789–53T.

The term "Color Number" refers to yellowness of the polymer pellets as determined at several wave lengths of light with a "Color Eye" as compared with a white Vitrolite standard by a method which is essentially that of ASTM D–1495–57T as described in ASTM Standard 1958, Paint & Naval Stores, part 8, page 753. A value of 95–100 indicates excellent white color.

The instrument used is a photoelectric "Color Eye" manufactured by the Instrument Development Laboratories, Attleboro, Mass.

Inert gas "superficial velocity" is the distance in feet through which the gas travels during one second in the drying towers, calculated on the basis of an empty tower.

The following examples describe completely specific embodiments illustrative of the best mode contemplated by us of carrying out our invention; but it is not intended to limit the scope of this invention to all details of the examples.

*Example 1*

Apparatus and procedure as schematically illustrated in the drawing, utilizing two towers as above described, were employed in the continuous drying of polycaproamide nylon–6 polymer as follows:

Nylon–6 cylindrical granules about 0.12 inch in diameter and 0.12 inch long are pumped as a 30% slurry in water to a Bird horizontal solid bowl centrifuge 12 in which inert gas is maintained under pressure higher than that in the tower. This centrifuge is capable of discharging products against pressure of at least 30 p.s.i.g. The nylon–6 is discharged into the top of the predrier tower 14. The predrier tower has diameter of 6 feet and is 48 feet high, including 5⅓ foot height of the conical section.

The particles of polymer move downward by gravity through tower 14 in segregated flow at average velocity of about 6.5 feet per hour, countercurrent to an upward flow of heated, partially spent gas of 72 standard cubic feet per pound of polymer from heater 36. The polymer granules serve as an excellent gas dispersion medium to assure uniformity of inert gas flow. The polymer residence time in tower 14 is about 6.2 hours. The polymer is withdrawn from the base of the predrier tower 14 and continuously discharged by means of rotary discharge device 16 at a rate controlled by the level controller 9 to maintain constant height of solids of about 40 feet in the cylindrical column. The polymer particles are pneumatically transported from the predrier 14 to the top of the final drying tower 31.

The polymer then travels in segregated flow through the final drying tower 31 countercurrent to the flow of drying gas from valve 42, which contains not over 2 p.p.m. oxygen by volume. The final drying tower 31 is 6 feet in diameter and 50 feet high, including 5⅓ foot height of the conical discharge section. The average polymer velocity in this tower is about 6 feet per hour. The dry polymer is discharged via a rotary device 43 at a rate controlled by level controller 49 to maintain the solids at constant height of about 34 feet in the cylindrical section of the tower.

The dew point of the gas fed to drying tower 31 is −40° C. at the ambient atmospheric pressure.

The operating conditions and physical properties for the above described continuous drying of nylon–6 polymer are shown in Table II below. The variation reported in velocity of polymer travel at bottom of first column vs. bottom of second column is due to shrinkage of polymer as water is removed.

TABLE II.—CONTINUOUS DRYING OF NYLON-6 IN TWO COLUMNS

[(A) Polymer Conditions]

| Point to be Measured | First Drying Column | | | Final Drying Column | |
|---|---|---|---|---|---|
| | Top of Column | Level Control Point at Top of Column | Bottom of the Cylindrical Column | Top of Column | Bottom of the Cylindrical Column |
| Polymer Temperature, ° C | 90 | 85 | 128 | 128 | 120 |
| Polymer Moisture Content, percent | 12 | 11 | 1.5 | 1.5 | .05+.01 |
| Polymer Residence Time, Hours | | | 6.17 | | 5.45 |
| Polymer Relative Formic Acid Viscosity Units | 57 | 57 | 57 | 57 | 58 |
| Velocity, Feet per Hour Polymer Travel in Column | | | 6.4 | | 5.9 |
| Polymer Color Number | 96 | 96 | 96 | 96 | 97 |
| Polymer Extractables, percent | 1.5 | 1.5 | 1.5 | 1.5 | 1.4 |
| Lbs. of Polymer (including the moisture) Processed Per Hour | 6,830 | 6,750 | 6,110 | 6,110 | 6,000 |

[(B) Gas Conditions]

| | First Drying Column | | Final Drying Column | |
|---|---|---|---|---|
| | At Tower Gas Exit Point | At Tower Gas Inlet Point | At Tower Gas Exit point | At Tower Gas Inlet Point |
| Inert Gas Temperature, ° C | 63 | 130 | 100 | 120 |
| Superficial Velocity of the Inert Gas, Feet per Second* | 2.87 | 2.48 | 2.15 | 1.95 |
| Inert Gas Pressure, p.s.i.g | 15 | 21.5 | 24 | 30 |
| Inert Gas, Percent Moisture by Volume | 3.45 | | 0.515 | |
| Dew Point of Entering Gas, ° C | | | | −40 |
| Inert Gas Flow, ft.³/min.* | 4,420 | 4,210 | 3,660 | 3,315 |

*At the indicated temperature, pressure and moisture content.

*Example 2*

The extent to which segregative drying is achieved in the operations of this invention is shown in in a run wherein the polymer feed was changed from polymer containing 0.085% titanium dioxide to polymer containing 0.12% titanium dioxide. The operations were essentially as in the above example, with total residence time of 15 hours as calculated from capacity of the towers at the operating level maintained for the solids, in pounds, and rate of production of dried polymer in pounds per hour. The product emerging, 15 hours after starting the feed of the 0.12% TiO₂ polymer, was analyzed and was found to contain 0.12% titanium dioxide, showing the second polymer was coming through on schedule without contamination by the first polymer.

We claim:

1. A process for segregative drying of nylon–6 polymer particles which comprises continuously feeding wet nylon–6 particles containing about 5%–20% by weight of water to the top layer of a cylindrical body of nylon–6 particles in a drying zone; continuously passing said body of particles downwardly at a velocity of not above about 30 feet per hour while maintaining said body in a single compact cylindrical mass of constant diameter and with height:diameter ratio in the range 5:1–20:1, terminating in a frusto-conical bottom discharge section with sides inwardly and downwardly sloping at an angle of about 5°–40° from the vertical and having ratio of maximum:minimum diameter in the range of 3:1–12:1; continuously passing upward through said body an inert drying gas having a temperature in the range of from about 80° C. to about 180° C., as it first contacts said particles and being at superatmospheric pressure not less than about 10 p.s.i.g., in amount of from about 40 to about 140 standard cubic feet of gas for each pound of particles on a dry basis; maintaining said particles in contact with said gas for a time of from about 1 hour to about 2 days; continuously removing dried particles at the bottom of said conical section; and withdrawing the resulting moist gas from the top layer of said cylindrical body of nylon–6 particles.

2. Process of claim 1 wherein the incoming gas, first contacting the polymer, contains not over 50 p.p.m. of oxygen and is at a temperature in the range of about 100° C.–150° C.; and wherein substantially constant rate of feed of particles and substantially constant level of the mass of polymer particles is maintained, the overall residence time for the entire drying process and the temperature, T, of the incoming gas being maintained in correlation in accordance with the formula.

$Log_{10}$ of the residence time in hours
$$= 2.912 - 0.0144 \ (T \pm 10° \ C.)$$

wherein T is in centigrade degrees.

3. Process wherein nylon–6 particles are dried in at least two drying stages in series, each drying stage being under the conditions defined in claim 2 except that the polymer fed to each stage after the first is the product from a preceding stage; and wherein the incoming gas has dewpoint not above about minus 20° C. and is introduced into the system in countercurrent contact with the polymer in the final drying stage; and the off-gas is withdrawn from the top layer of polymer particles in said final stage, and is then reheated and passed in countercurrent contact with polymer, successively in each next earlier drying stage, the earliest drying stage being that to which the incoming wet polymer is fed.

4. Process of claim 3 wherein the spent gas withdrawn from the earliest drying stage is passed through a drying medium and through a heater and is filtered to remove dust, a portion of this gas being passed through a deoxygenator; and the resulting dust-free, oxygen-free drying gas is introduced into the final drying stage as incoming gas.

5. Process of claim 4 wherein the incoming gas is about 66%–88% nitrogen, about 10%–30% carbon dioxide, and about 1%–5% hydrogen.

6. Apparatus for drying nylon–6 particles comprising a cylindrical vertical tower, with frusto-conical discharge section having sides inwardly and downwardly sloping at an angle from the vertical of about 5°–40°, the frusto-conical section having ratio of maximum diameter:minimum diameter of about 3:1–12:1, the cylindrical section of said tower having substantially constant diameter and having a ratio of height:diameter in the range 5:1–20:1, said conical discharge section being surrounded by a plenum chamber through which drying gas can be introduced into said tower and said cylindrical section being provided at the top with an inlet for wet polymer particles and an outlet for withdrawing gas; said gas outlet being connected to a vessel containing a drying medium, and to a blower for applying superatmospheric pressure to the gas passing therethrough, and to a heat exchanger for adjusting gas temperature, and to a filter, and to lines through which the gas can be recycled to the plenum chamber for introduction into said tower; and a deoxygenator connected around said blower.

7. Apparatus of claim 6 wherein said tower is provided with a gas-tight centrifuge for separating wet solid nylon–6 particles from an aqueous slurry and feeding said separated particles into said tower; and with a level controller and positive discharge means operated by said level controller to maintain constant level of the solids in the tower as solids are fed thereto.

References Cited by the Examiner

UNITED STATES PATENTS

| | | | |
|---|---|---|---|
| 2,834,429 | 5/1958 | Kinsella et al. | 34—36 |
| 3,882,912 | 4/1959 | Reeg et al. | 34—168 X |
| 3,212,197 | 10/1965 | Crawford | 34—36 X |

JOHN J. CAMBY, *Acting Primary Examiner.*